United States Patent [19]

Willis et al.

[11] 3,834,233

[45] Sept. 10, 1974

[54] APPARATUS FOR MEASURING THE LEVEL OF THE CONTENTS OF A CONTAINER

[75] Inventors: Andrew Douglas Willis, Growborough; Michael Bruce Thurman, East Grinstead, both of England

[73] Assignee: Wilson Walton International Limited, Surrey, England

[22] Filed: Nov. 3, 1972

[21] Appl. No.: 303,408

[30] Foreign Application Priority Data
Nov. 5, 1971   Great Britain .................... 51613/71

[52] U.S. Cl. .............................. 73/290 V, 340/1 L
[51] Int. Cl. ........................................... G01f 23/28
[58] Field of Search ....... 73/290 V; 340/3 R, 244 R, 340/1 L

[56] References Cited
UNITED STATES PATENTS
2,753,542  7/1956  Rel et al. ............................ 340/3 R
2,990,543  6/1961  Rel .................................... 73/290 V
3,394,589  7/1968  Tomioka ........................... 73/290 V

*Primary Examiner*—Richard C. Queisser
*Assistant Examiner*—Daniel M. Yasich
*Attorney, Agent, or Firm*—Wenderoth, Lind & Ponack

[57] ABSTRACT

Method and apparatus for determining the level of the contents of a container — typically the level of oil in a bulk oil tank are disclosed. An ultrasonic transmitter and receiver arrangement is mounted at the top of the tank to direct sound energy down into the tank and receive an echo from the surface of the contents. In order to compensate for inaccuracies due to changes in the velocity of sound a second receiver is preferably positioned a fixed distance from the transmitter and both received signals are processed to cancel the effects of any velocity variation in the speed of sound.

4 Claims, 2 Drawing Figures

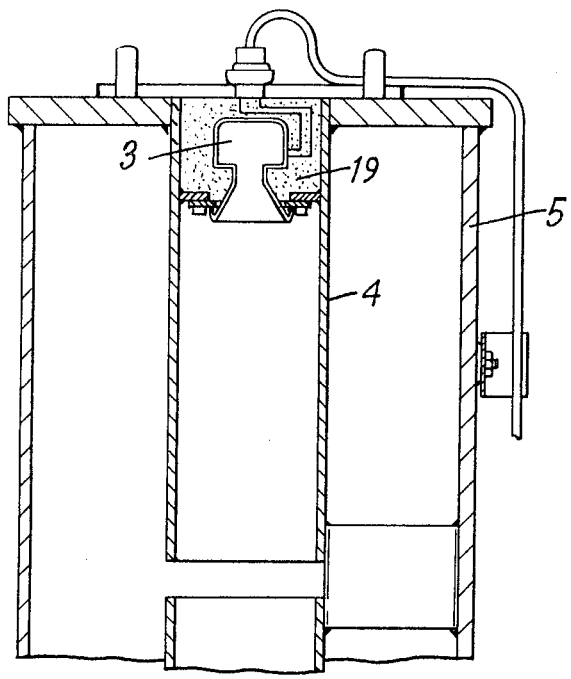
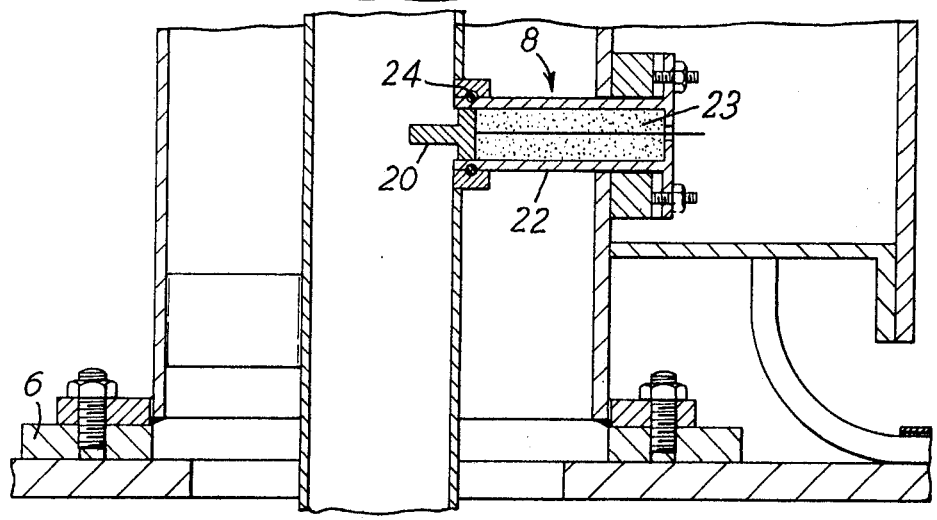
FIG. 2.

APPARATUS FOR MEASURING THE LEVEL OF THE CONTENTS OF A CONTAINER

The invention relates to an apparatus and method for measuring the level of the contents of a container. Particular application for the invention is found in controlling the filling of large tanks such as the tanks of a sea-going oil tanker. However, the invention is not restricted to such application and may be used to determine the level of liquids or solids in other kinds of tanks or large containers.

In order to prevent the overflow of oil or other cargo from a tank or hold which is being filled it is necessary to monitor accurately the level of the contents, particularly as the level approaches the top. In filling oil tankers it has been proposed to determine the level of oil by monitoring the level of a float floating on the surface. For example, mechanical linkages have been used to determine the float level. However, such linkages soon become ineffective in practice because of fouling by the oil. The present invention seeks to provide an apparatus and method of monitoring the contents of containers which do not suffer from such disadvantages.

According to one aspect of the invention there is provided apparatus for measuring the level of the contents of a container comprising an ultrasonic transmitter and an ultrasonic receiver both mounted at or near the top of the container, the transmitter being arranged to direct ultrasonic vibrations down into the container through air or gas therein and the receiver being responsive to ultrasonic vibrations reflected from the surface of the container contents; means for energising the transmitter; and output means connected to give an output representative of the level of the said surface according to the time between transmission of ultrasonic vibrations and receipt of an echo thereof from the surface of the container contents.

According to another aspect of the invention there is provided a method of measuring the level of the contents of a container, the method consisting in directing ultrasonic vibrations down into the container from the top through air or gas therein, receiving, with an ultrasonic receiver echoes of the vibrations reflected from the surface of the contents of the container and determining the level of the contents in accordance with the time between transmission of ultrasonic vibrations and receipt of a reflection thereof. It is to be understood that as used herein "ultrasonic" means high frequency sound energy which is usually, but not necessarily, above audio frequencies.

Although it is possible to have a receiver, which is physically separate from the transmitter, it is preferred to use a single transducer for transmission and reception. The transducer is preferably an electromagnetic transducer. It is possible that the surface of the contents will not be horizontal. This may arise because, for example, the container is tiled in the case of liquids or in the case of grains or powders because the material is heaped. In order to ensure receipt of the reflected echo from a non-horizontal surface it is desirable either to use a wide ultrasonic beam or to mount the transducer at the top of a stilling pipe extending substantially from top to bottom of the container. Typically, for example, in an arrangement without a stilling pipe the width of the beam should be between 1° and 9° or perhaps greater depending upon the particular application. The wider the beam width the greater is the angle of the surface which can be accommodated at a given depth, or conversely the greater is the effective depth which can be detected within given limits of the angle of the surface. The configuration of the transducer and the frequency at which best operation is given will also depend upon beam width. Thus, the frequency chosen for the ultrasonic vibrations depends largely on the required beam width and range. For example, satisfactory operation for some applications is found at a frequency of 25 kHz. which gives a beam width of ½° and a range of 40 feet. Such a range is not suitable for the largest tankers where the tank depth may be greater than 100 feet. For such application, therefore, a beam width greater than 1° is envisaged with a corresponding decrease in operating frequency to about 5kHz. It is envisaged that any ultrasonic frequency up to 300 kHz. or perhaps more may be used for various applications.

Preferably the ultrasonic vibrations are transmitted in the form of spaced pulses, the pulse spacing being sufficient to allow receipt of an echo before the next pulse is transmitted. Typically, the spacing of the pulses is about 100 milliseconds and the length of each pulse is sufficient to allow 50 or 60 cycles of the vibrations at the particular frequency of operation. The operating currents and voltages required will vary with the particular frequency of operation and typical figures are a peak voltage of between 5 and 10 volts at an operating frequency of 20 kHz.

For a given beam width it is possible that an echo may not be received from the surface if the surface is tilted badly and if the level is very low. In order to help avoid missing an echo under these circumstances if no stilling pipe is used it is preferred to mount the transmitter and receiver near one side of the tank so that the echo may be received by reflection from the side of the tank.

The transmission time of ultrasonic vibrations through the gas may vary with temperature, humidity and the type of gas. In order to avoid the effects of such changes a fixed reflector may be placed a short distance below the transmitter so that in response to each transmitted pulse there will be received two echoes, the first from the fixed reflector and the second from the surface of the contents. By dividing the transmission time to and from the contents surface by the transmission time to and from the fixed reflector an indication can be derived representative of the level of the contents which is independent of the rate of transmission through the gas. Alternatively, and preferably, a second transducer may be used instead of a reflector.

The invention will further be described with reference to the accompanying drawings, of which:

FIG. 2 is a cross-sectional view of the upper end of the stilling pipe of the FIG. 1 arrangement.

Figure 1:
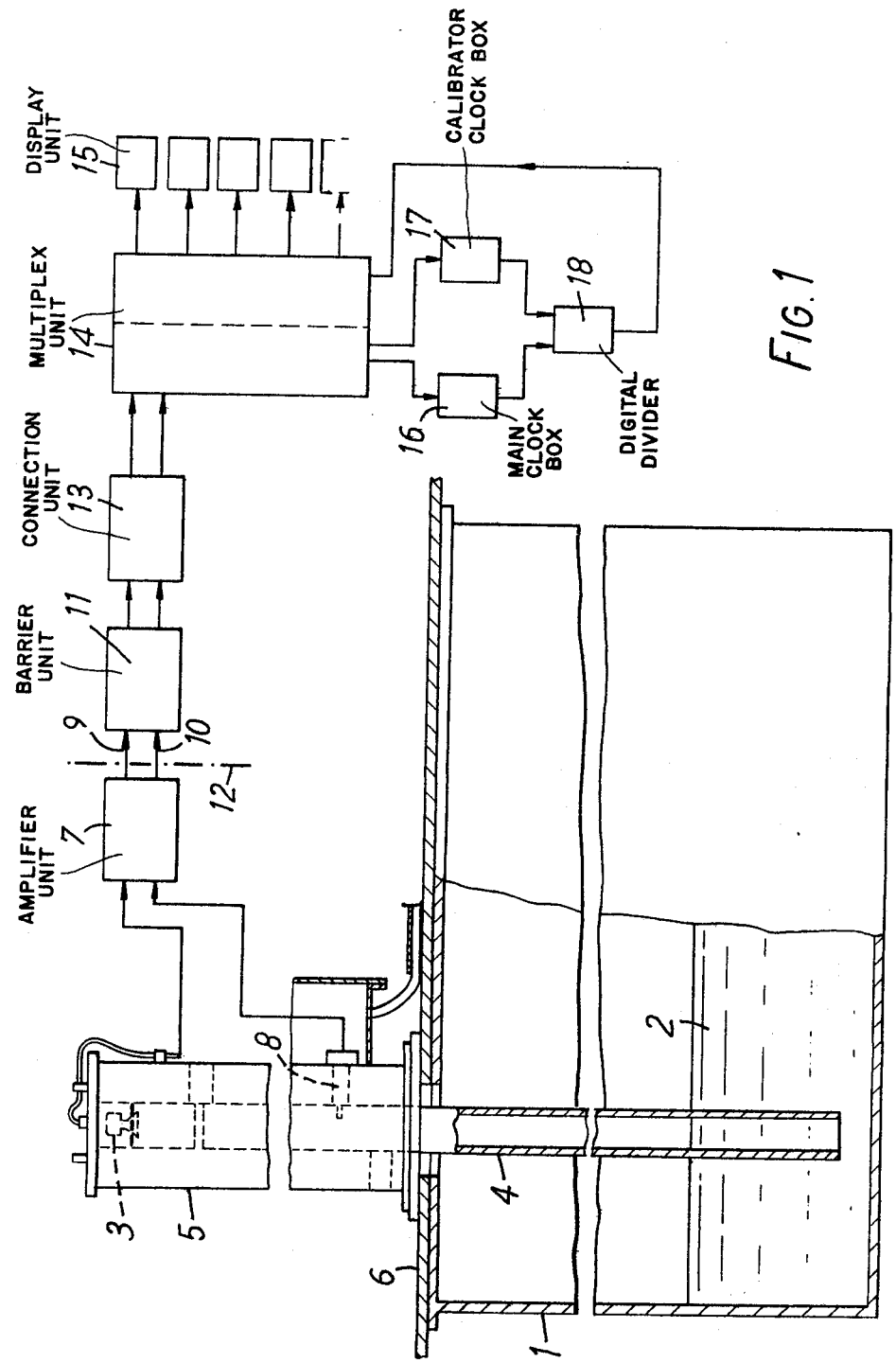
FIG. 1 is a schematic illustration of one embodiment of the invention.

Referring to the drawing the figure shows a tank 1 which is one of fifteen oil tanks in a sea-going oil tanker. Typically, each of the tanks is 100 feet deep. In loading the tanker the tanks are filled with oil 2 by pumps (not shown). In order to monitor the level of oil in each of the tanks and to give an indication or warning when the oil level reaches the top of the tank there is provided for each tank an ultrasonic transducer 3. The transducer is a high-frequency electromagnetic speaker and is mounted at the top of a stilling pipe 4. The stilling pipe is mounted within a stand pipe 5 which is bolted to the deck 6 of the vessel. Pipe 5 is about 6 feet long and the stilling pipe 4 extends to within a few inches of the bottom of tank 1. The stilling pipe has intermediate supports (not shown) along its length and gas vents (not shown) near the top.

The transducer 3 is energised by current from a transducer amplifier unit 7 which provides periodic pulses. In response to each pulse the transducer emits a corresponding pulse of sound 1 msec long having dominant frequency components of 20 kHz. and 5 kHz. The time spacing of the pulses is 100 msec. The sound travels down the stilling pipe and is reflected back from the surface of the oil. The transducer 3 responds to the echo sound to provide a signal to amplifier unit 7.

Situated within the stilling pipe 4 near the bottom of stand pipe 5 is a second transducer 8 which is a piezoelectric ceramic device which responds to a strong sounds in pipe 4 to provide signals to the amplifier unit 7. Thus, each output pulse from unit 7 which is applied to transducer 3 results in a sound pulse. This sound is received along pipe 4 by transducer 8. Since this direct sound is strong, transducer 8 responds to give a pulse to an input of unit 7. Sound is reflected from the oil surface and is incident first on transducer 8. However, the reflected sound is weak and transducer 8 does not respond sufficiently to give an output to unit 7. The reflected sound then reaches transducer 3, which is more sensitive than transducer 8 and which gives an output to unit 7. The amplifier unit 7 has two output lines 9 and 10. Line 9 carries pulses the timing of which correspond to the issuance and receipt of sound from transducer 3. Line 10 carries pulses the timing of which correspond to the issuance of sound from transducer 3 and receipt by transducer 8. Thus, the time spacing of the pulses on line 9 represents the depth of the oil surface, subject to the velocity of sound, and the time spacing of the pulses on line 10 is dependent only on the velocity of the sound, since the spacing of the transducers is fixed. Thus, dividing the time-spacing of the pulses on line 9 by the time-spacing of the pulses on line 10 gives an output proportional to the depth of the oil surface below transducer 3 independent of the velocity of the sound. The apparatus effects this division and gives an indication of oil depth.

The outputs from unit 7 are applied to a Zener diode barrier unit 11 which ensures that the voltages and currents handled by the unit 7 and transducers are of a safe level. The broken line 12 indicates the division between the "safe" parts of the system (on the left of the line) which may be placed in a fire risk region and the non-protected parts of the system (on the right of the line) which need to be situated in a region of low fire risk.

The signals from barrier unit 11 are passed via a multiplex connection unit 13 to a multiplex unit 14. Unit 14 receives the corresponding outputs from the other tanks and in response to a master timer (not shown) processes them in sequence to give corresponding oil depth indications on a set of fifteen display units 15. Each processing period lasts for 5 seconds or so, then the next tank is measured. When the outputs for a particular tank are sampled by unit 14 in their turn, the signals on line 9 are effectively applied to control a main clock 16 and the signals on line 10 are effectively applied to control a calibrator clock 17. The clocks are gated by the pulses on the lines so that a sequence of clock pulses corresponding in number to the time delay between the pulses on each line is applied to respective inputs of a digital divider 18. The divider divides the number from the main clock by the number from the calibrator clock and a number representative of the ratio, and thus the depth of the oil surface below the transducer 3, is applied to the appropriate display unit 15 via the multiplex unit 14. Thus, continuous displays of depth are maintained for all tanks. An alarm unit (not shown) is provided which responds to the multiplex outputs to give an alarm if the oil-level in a tank reaches a dangerous level.

Referring now to FIG. 2 there is shown in detail the disposition of the transducers. Transducer 3, is in this embodiment, a tweeter. The body of the transducer is encapsulated in a resin potting compound 19.

Transducer 8 comprises a piezoelectric ceramic probe 20 in a mount 22 filled with a resin potting compound 23. The mount 22 is removable and sealing is effected by a rubber 'O' ring seal 24.

As an adjunct to the monitoring of the levels of the contents of containers in a ship it is envisaged that the draft of the ship may be monitored in a similar way. Thus, a transducer of the general kind shown at 3 in the drawing, perhaps alternatively a piezoelectric transducer, may be used at the bow and the stern of the vessel with or without a stilling pipe to direct ultrasonic vibrations to the surface of the sea and to receive echoes therefrom. The transmission time will depend upon how low the vessel lies in the water. This may be monitored in a similar way to that described with reference to the drawings, the draft transducers being connected in additional inputs to the multiplex unit and having individual depth gauge displays.

We claim:

1. Apparatus for measuring the level of the contents of fluent material of the contents of a container comprising: an ultrasonic wave transmitting means and a first ultrasonic receiving means both mounted at the top of the container, the transmitting means being arranged to direct ultrasonic vibrations down into the container through gas therein and the receiving means being responsive to ultrasonic vibrations reflected from the surface of the container fluent material contents; means connected for energizing the transmitting means to provide periodic pulses therefrom, a second ultrasonic receiving means fixedly located a short distance below the transmitting means for receiving strong vibrations relative to said vibrations reflected from the fluent material contents surface; output means connected to both the first receiving means and second receiving means to give an output representative of the level of the said surface according to the time between transmission of ultrasonic vibrations and receipt of an echo thereof from the surface of the container fluent material contents; and compensating means in the output means responsive to the time taken for ultrasonic vibrations to pass from the transmitting means to the second receiving means to compensate for changes in transmission speed through the gas in determining the level contents.

2. Apparatus as claimed in claim 1 wherein the second ultrasonic receiving means is a receiving transducer sensitive enough to respond only to ultrasonic vibrations received directly from the transmitter.

3. Apparatus as claimed in claim 1 wherein the means responsive to the time taken comprises a calibrator clock generator which is gated to deliver a number of clock pulses proportional to the said time taken, there being also a main clock generator which is gated to deliver a number of clock pulses proportional to the time between transmission from the ultrasonic transmitter and receipt of an echo from the surface of the container contents, and divider means for dividing the number of clock pulses from the main clock generator by the number of clock pulses from the calibrator clock generator and giving an output proportional to the ratio.

4. Apparatus as claimed in claim 3 wherein further containers are monitored, each container having a respective ultrasonic transmitter and receiver and there being a multiplex unit for applying signals from the containers in turn to be processed by the clock generator and divider arrangement.

* * * * *